UNITED STATES PATENT OFFICE 2,653,933

AMINOHETEROCYCLES

John G. Erickson, Greenwich, Conn., assignor to American Cyanamid Company, New York, N. Y., a corporation of Maine No Drawing. Application August 30, 1950,
Serial No. 182,415

3 Claims. (Cl. 260—249.5)

The present invention relates to new compounds, namely 3-amino-as-triazine and its lower alkyl derivatives, and to a method for their preparation.

It is an object of the invention to react and $\alpha$-diketone with aminoguanidine bicarbonate according to the following equation:

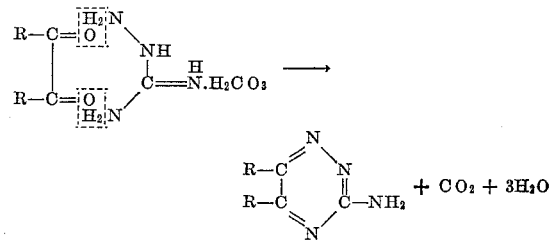

In this reaction R is hydrogen or a lower alkyl group. The R's may be the same or different. By lower alkyl group is meant octyl or lower.

Additional objects will be apparent from the discussion hereinafter.

The following examples illustrate without limiting the invention.

EXAMPLE 1

*3-amino-as-triazine*

80 parts of 30% glyoxal solution in water was added to a suspension of 76.5 parts of aminoguanidine bicarbonate in 1200 parts of water at 25° C. The mixture was stirred for two hours while carbon dioxide was evolved from the mixture. After standing for 17 hours at 25° C. to increase the yield slightly, the mixture was filtered and evaporated to dryness under reduced pressure. The residue was extracted with 800 parts of cold methanol, which was filtered and distilled to one-tenth its original volume, then chilled and filtered to yield 24 parts of 3-amino-as-triazine. After recrystallization from acetonitrile, the product was obtained as white needles, melting at 171.5°–172.5° C. The identity of the material was confirmed by analyses.

|  | Percent Carbon | Percent Hydrogen | Percent Nitrogen |
|---|---|---|---|
| Calculated for 3-amino-as-triazine | 37.50 | 4.19 | 58.31 |
| Found | 38.03, 38.03 | 4.35, 4.30 | 58.44, 58.05 |

EXAMPLE 2

*3-amino-5,6-dimethyl-as-triazine*

A solution of 64.4 parts of biacetyl in 250 parts of water was added over a period of 15 minutes to a suspension of 102 parts of aminoguanidine bicarbonate in 1250 parts of water at 25° C. After standing 22 hours at 25° C., the mixture was warmed to 50° C. for an hour to increase the yield slightly, then chilled and filtered to yield 60.6 parts of 3-amino-5,6-dimethyl-as-triazine. The filtrate was concentrated to about one-fourth of its original volume and, after chilling, yielded an additional 6.2 parts of the triazine. After recrystallization from a mixture of three volumes of toluene and one volume of ethanol, the triazine was obtained as a very light yellow solid, melting at 211°–212° C. The identity of this material was confirmed by analyses.

|  | Percent Carbon | Percent Hydrogen | Percent Nitrogen |
|---|---|---|---|
| Calculated for 3-amino-5,6-dimethyl-as-triazine | 48.37 | 6.50 | 45.13 |
| Found | 48.25, 48.52 | 6.46, 6.73 | 45.13, 45.13 |

Other lower alkyl 3-amino-as-triazines can be made by reacting the corresponding $\alpha$-diketone with aminoguanidine bicarbonate in the same manner as in the preceding examples. For example

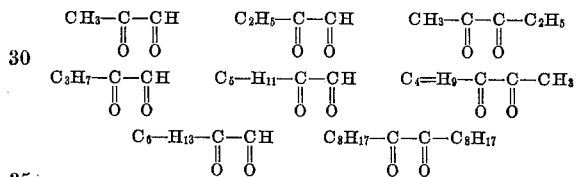

and the like can be reacted in the same way as the diketones of Examples 1 and 2 to give the corresponding triazine.

The reaction can be carried out in any suitable inert solvent, such as ethanol, butanol, the other lower alcohols, the cellosolves and the like. The proportions of reactants can be varied widely, for example, 0.1 to 10 moles of diketone to 1 mole of aminoguanidine, or even wider but approximately stoichiometric ratios are preferred, whereby the necessity of recovering considerable amounts of unreacted reagents is avoided. It is preferred that the reaction be conducted at room temperature, but there is nothing particularly critical in this feature, and the reaction temperature can be varied considerably, i. e., when using water as a solvent, from 5°–95° C. The operative temperature limits with other solvents will of course depend upon the freezing and boiling points of the respective solvents.

While the invention has been described with particular reference to specific embodiments, it is to be understood that it is not to be limited thereto but is to be construed broadly and restricted solely by the scope of the appended claims.

I claim:

1. The method of preparing a 3-amino-as-triazine that comprises subjecting aminoguanidine bicarbonate to the action of a diketone of the formula

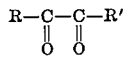

in which R and R' are members of the group consisting of hydrogen and alkyl groups, the alkyl group containing not more than eight carbon atoms, in an inert solvent, until the corresponding 3-amino-as-triazine is formed, and recovering the thus-formed triazine.

2. The method according to claim 1 in which glyoxal is reacted with aminoguanidine bicarbonate in water to form 3-amino-as-triazine.

3. The method according to claim 1 in which biacetyl is reacted with aminoguanidine bicarbonate in water to form 3-amino-5,6-dimethyl-as-triazine.

JOHN G. ERICKSON.

References Cited in the file of this patent

UNITED STATES PATENTS

| Number | Name | Date |
|---|---|---|
| 2,197,357 | Widmer | Apr. 16, 1940 |
| 2,294,873 | D'Alelio | Sept. 1, 1942 |

OTHER REFERENCES

Thiele—Annalen der Chemie (1898) vol. 302, p. 276.

Ekeley—Rec. Trav. Chim. de Pay Bas, vol. 59, pp. 496–502 (1940).